United States Patent [19]

Riddle

[11] Patent Number: 5,490,314

[45] Date of Patent: Feb. 13, 1996

[54] STRETCH VEHICLE CONVERSION METHOD

[76] Inventor: Matthew G. Riddle, 7013 Noonwood Ct., San Jose, Calif. 95120

[21] Appl. No.: 325,754

[22] Filed: Oct. 20, 1994

[51] Int. Cl.⁶ .................................................. B21K 21/16
[52] U.S. Cl. ..................... 29/401.1; 29/402.04; 29/426.2
[58] Field of Search .............................. 27/401.1, 402.01, 27/402.04, 426.1, 426.2; 296/188

[56] References Cited

U.S. PATENT DOCUMENTS

| | | | |
|---|---|---|---|
| 4,342,146 | 8/1982 | Hanson | 29/401.1 |
| 4,599,780 | 7/1986 | Rohrbacher | 29/401.1 |
| 4,654,946 | 4/1987 | Phillips | 29/401.1 |
| 4,766,660 | 8/1988 | La Rose | 29/401.1 |

*Primary Examiner*—David P. Bryant

[57] ABSTRACT

This invention pertains to a method of converting a family of the M113 vehicle to enhance the performance of the vehicle. By using the stretch and fabrication method disclosed herein in addition to upgrading mechanical components, volume under armor, mobility and payload capacity of the vehicle are enhanced.

6 Claims, 3 Drawing Sheets

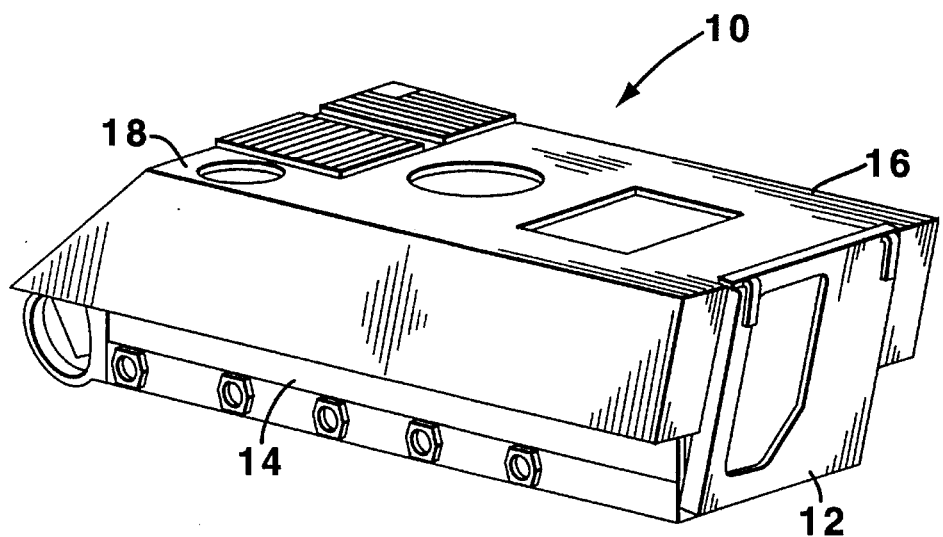
FIG_1
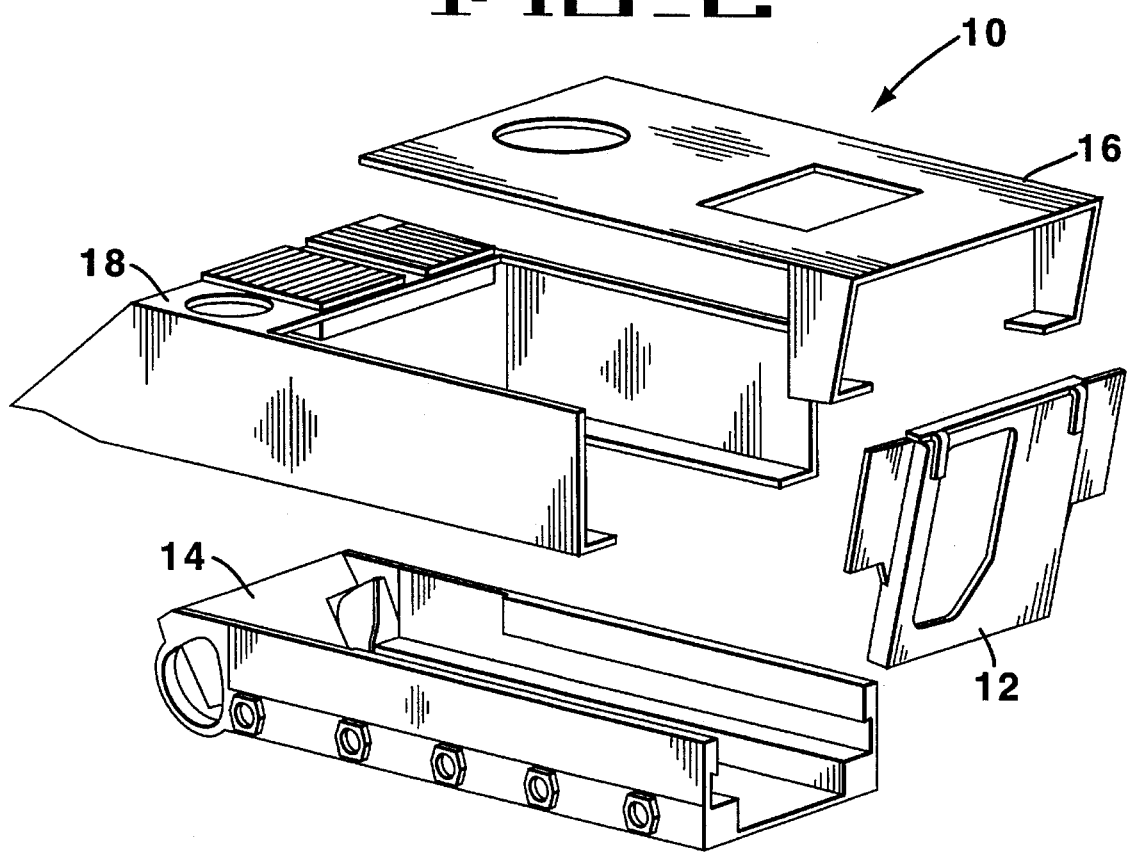
FIG_2

FIG_3
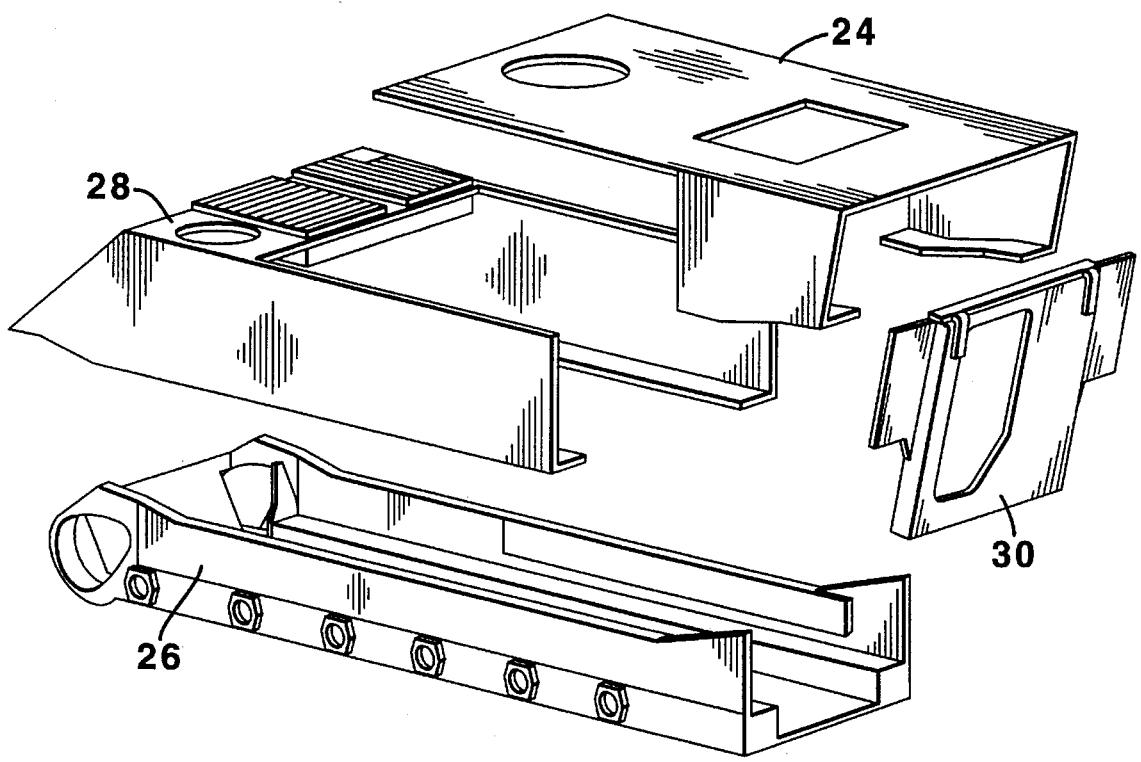
FIG_4
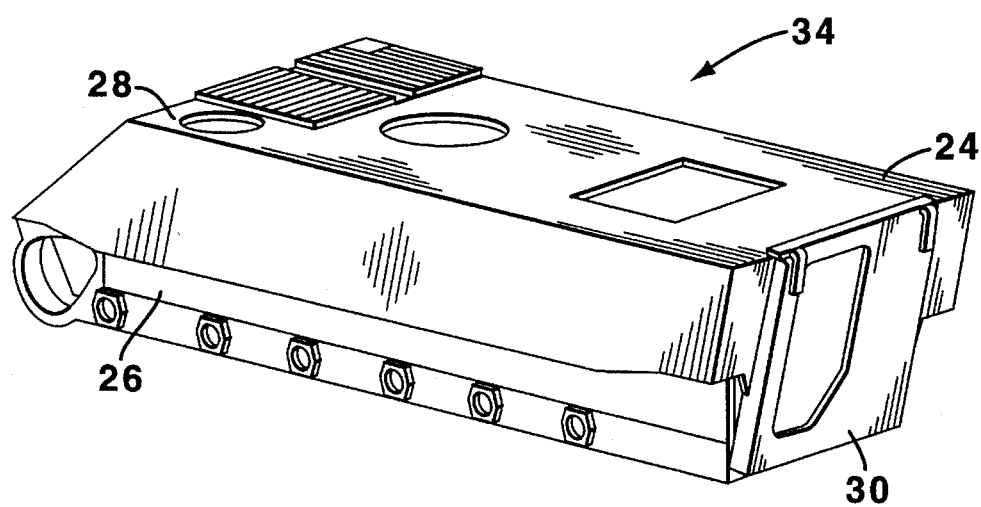

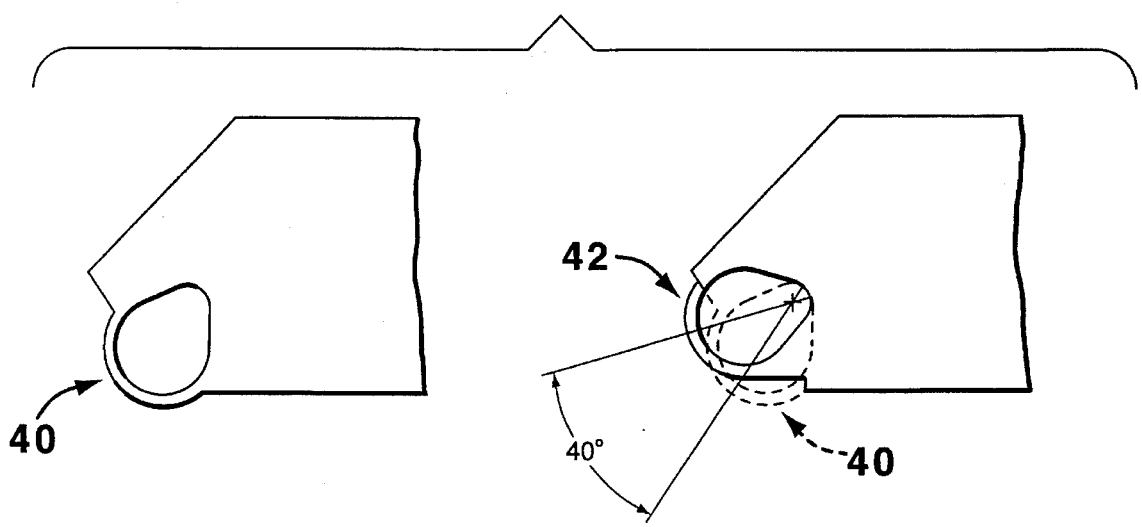
FIG_5

STRETCH VEHICLE CONVERSION METHOD

FIELD OF THE INVENTION

The present invention provides a method for converting a vehicle to create additional volume, increase the payload capacity and maintain superior mobility compared to all M113 vehicles over all terrain.

SUMMARY OF THE INVENTION

The present invention is primarily concerned with the modernization of M113 family of vehicles. This family of vehicles has undergone various changes over the years. The present invention provides the latest version of upgrade and improvement methods to make the vehicles mobile tactical units with light and effective armor. Particularly, the stretch vehicle conversion method disclosed herein includes the removal of certain components and the stripping of the vehicle to a bare aluminum hull. The vehicle parts are then modified and assembled to thereby fabricate a vehicle with new configurations and upgraded capabilities.

BRIEF DESCRIPTION OF THE DRAWINGS

FIG. 1 is a perspective drawing of an M113 structure.

FIG. 2 is an explosion view of an M113 structure with the major parts indicated.

FIG. 3 is an explosion view of a modified M113 structure with the major; parts indicated.

FIG. 4 is a perspective view of a modified M113 structure.

FIG. 5 is a side view showing the rotation of the final drives about the input shaft.

DESCRIPTION OF THE PREFERRED EMBODIMENT

The present invention provides a method of modifying and converting an M113 vehicle structure to meet higher mobility and performance requirements. Utilizing the method of modifying and converting an M113 vehicle, disclosed herein, significant increments in cross country mobility, volume under armor and payload capacity are realized.

FIG. 1 shows a perspective drawing of an M113 structure 10. FIG. 2 is an exploded view of structure 10. Rear plate 12 is disposed between lower hull 14 and top plate 16. Further, upper hull 18 is placed on top of lower hull 14 and is partially mated with top plate 16.

FIG. 3 shows an exploded view of a modified structure of an M113. Top plate 24 is modified in length and includes side wall extensions compared to top plate 16. New lower hull 26 is stretched. New upper hull 28 is fabricated to match new lower hull 26. New rear plate 30 is fabricated to match with top plate 24, new lower hull 26 and new upper hull 28. FIG. 4 is a perspective drawing of all the new and modified structures assembled and welded together to compose a stretch vehicle structure 34, a modified version of structure 10.

FIG. 5 shows the initial position of final drives 40 and the new position of the final drives 42 after they have been rotated around the input shaft. The phantom lines show the initial position of the drives.

The discussion hereinabove relates to the most significant structural organizations of the stretch vehicle invention. The operations of the present invention under a best mode scenario is discussed hereinbelow.

Referring to FIGS. 1 and 2, 3 and .4, the conversion process includes starting with structure 10 and removing all of the components to strip the vehicle to a bare aluminum hull. Lower hull 14 and top plate 16 are removed. The remainder of M113 structure 10 is reused with a new lower hull 26 and new top plate 24. Over 70% of the M113 structure 10 is directly utilized . The remaining 30% is recycled for cash.

Referring now to FIGS. 1, 2 and 3 the method of conversion includes removing rear plate 12 and removing lower hull 14. Further, top plate 16 is also removed. Lower hull 14 and top plate 16 are discarded. A new lower hull 26 is fabricated. New lower hull 26 includes an extension of 34¼ inches and forms the basis for the stretched chassis. New top plate 24 with side extensions is also fabricated to match with new lower hull 26. The fabrication of new lower hull 26 includes rotating the position of final drives 40 to new position 42 (see FIG. 5). Upper hull 18 is modified to form new upper hull 28. Finally, these pans are welded together to compose the new stretch vehicle structure 34 (see FIG. 4).

Utilizing structure 34, the modified M113 provides 70 cubic feet additional volume under armor and increases the payload capacity by about 3,000 lb. The power train consists of a 350 hp turbocharged/aftercooled diesel engine driving through an electronically controlled four speed automatic cross-drive transmission. The advanced suspension and improved track design provide for cross country mobility superior to most combat vehicles over all terrain. The improved vehicle retains the transportability features of the M113 and is designed to be roll-on/roll-off C-130 air droppable.

While a preferred embodiment of the stretch vehicle conversion method has been shown and disclosed, it will be appreciated that various changes and modifications may be made therein without departing from the spirit of the invention as defined by the scope of the appended claims.

What is claimed is:

1. An overhaul and conversion method for an armored vehicle of the M113 family comprising the steps of:

providing an armored vehicle of the M113 type;

said armored vehicle comprising a rear plate, upper plate, upper hull, and lower hull;

removing said rear plate from said armored vehicle;

removing said lower hull from said armored vehicle;

discarding said lower hull and said lower plate;

fabricating a new lower hull;

fabricating a new top plate with side wall extensions;

modifying said upper hull to form a new upper hull;

modifying said rear plate to form a new rear plate; and welding and joining together said new lower hull, said top plate, said new upper hull and said new rear plate to form a new vehicle structure.

2. The method according to claim 1 wherein said new lower hull is fabricated to be longer than the original lower hull.

3. The method according to claim 1 wherein the side wall extensions of said new top plate are fabricated to mate with said new lower hull.

4. An overhaul and conversion method for an armored vehicle of the M113 family to enhance performance in mobility, volume under armor, payload capacity and threat survivability comprising the steps of:

providing a vehicle of the M113 type;
said armored vehicle comprising a rear plate, upper plate, upper hull, lower hull and final drives eyelet for an input shaft;
removing said rear plate from said armored vehicle;
removing said lower hull from said armored vehicle:
discarding said lower hull and said lower plate;
fabricating a new lower hull which includes rotating said final drives eyelet about said input shaft;
fabricating a new top plate with side wall extensions;
modifying said upper hull to form a new upper hull;
modifying said rear plate to form a new rear plate; and
welding said new lower hull, said top plate, said new upper hull and said new rear plate to form a new vehicle structure.

5. The method according to claim 4 further including installing a 350 horse power engine.

6. The method according to claim 4 wherein said new lower hull is 34¼ inches longer than the original lower hull.

* * * * *